US011171460B1

(12) United States Patent
Wu

(10) Patent No.: US 11,171,460 B1
(45) Date of Patent: Nov. 9, 2021

(54) TOOLS FOR COUPLING AND DECOUPLING A CABLE CONNECTOR

(71) Applicant: Synopsys, Inc., Mountain View, CA (US)

(72) Inventor: Chih I Wu, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 79 days.

(21) Appl. No.: 16/796,709

(22) Filed: Feb. 20, 2020

Related U.S. Application Data

(60) Provisional application No. 62/807,868, filed on Feb. 20, 2019.

(51) Int. Cl.
*H01R 43/22* (2006.01)
*H01R 43/26* (2006.01)

(52) U.S. Cl.
CPC ............. *H01R 43/22* (2013.01); *H01R 43/26* (2013.01)

(58) Field of Classification Search
CPC .... H01R 43/26; H01R 43/22; H01R 13/6335; H01R 13/633; G02B 6/3898
See application file for complete search history.

(56) References Cited

U.S. PATENT DOCUMENTS

| | | | | |
|---|---|---|---|---|
| 6,733,323 B2 * | 5/2004 | Tso-Chin | ............ | H01R 13/6335 439/484 |
| 7,020,376 B1 * | 3/2006 | Dang | ........................ | B25B 9/02 385/135 |
| 7,534,128 B2 * | 5/2009 | Caveney | ............ | H01R 13/6272 29/764 |
| 10,797,459 B2 * | 10/2020 | Donati | ................... | H01R 43/26 |

* cited by examiner

*Primary Examiner* — Briggitte R. Hammond
(74) *Attorney, Agent, or Firm* — Sterne, Kessler, Goldstein & Fox P.L.L.C.

(57) ABSTRACT

A tool for coupling and decoupling a connector of a cable. The tool includes a body, a bracket, and a first hook. The body has a first end portion, a second end portion opposite the first end portion, and an intermediate portion between the first end portion and the second end portion. The body has a longitudinal axis running between the first end portion and second end portion. The body also has a first surface and a second surface opposite the first surface. The bracket is disposed at the first end portion. The bracket defines a cavity configured to receive a portion of the connector, and the bracket is configured to push the connector as the tool moves in a first direction. The first hook is disposed at the intermediate portion. The first hook is configured to engage an opening defined by the connector and pull the connector as the tool moves in a second direction different than the first direction.

20 Claims, 14 Drawing Sheets

FIG. 3D  FIG. 3E  FIG. 3F

TOOLS FOR COUPLING AND DECOUPLING A CABLE CONNECTOR

CROSS-REFERENCE TO RELATED APPLICATIONS

This application claims the benefit of U.S. Provisional Patent Application No. 62/807,868, filed Feb. 20, 2019, which is incorporated herein in its entirety by reference thereto.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

SPECIFICATION—DISCLAIMERS

In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.

FIELD(S) OF TECHNOLOGY

This disclosure generally relates to a tool for coupling and decoupling a connector of a cable.

BACKGROUND

A server rack may include a number of electronic components including, for example, hard drives, optical drives, network interfaces, and power supplies. These and other server components may be operatively connected by cables extending from connection terminals associated with the corresponding components. Some server components may require multiple cable connections to link them to other components in the server rack. As a result, the area near a connection terminal may be crowded by nearby cables. Sometimes, a connection terminal may be provided at a recessed location. In these and other instances, there is limited space for a person to couple or decouple a connector from a terminal by hand.

SUMMARY

The claims signify a brief description of one or more of the innovations, embodiments, and/or examples found within this disclosure.

Some embodiments described herein are directed to a tool for coupling and decoupling a connector of a cable. The tool includes a body, a bracket, and a first hook. The body has a first end portion, a second end portion opposite the first end portion, and an intermediate portion between the first end portion and the second end portion. The body has a longitudinal axis running between the first end portion and second end portion. The body also has a first surface and a second surface opposite the first surface. The bracket is disposed at the first end portion. The bracket defines a cavity configured to receive a portion of the connector, and the bracket is configured to push the connector as the tool moves in a first direction. The first hook is disposed at the intermediate portion. The first hook is configured to engage an opening defined by the connector and pull the connector as the tool moves in a second direction different than the first direction.

Some embodiments described herein are directed to a tool for coupling and decoupling a connector of a cable. The tool includes a body, a first bracket, a first hook, a second bracket, and a second hook. The body has a first end portion, a second end portion opposite the first end portion, and an intermediate portion between the first end portion and the second end portion. The body also has a longitudinal axis running between the first end portion and second end portion. The first bracket is disposed on the first end portion and defines a first cavity configured to receive a portion of a connector. The first hook is disposed on the intermediate portion. The second bracket is disposed on the second end portion and defines a second cavity configured to receive the portion of the connector. The second hook is disposed on the intermediate portion. The first cavity is configured to receive the portion of the connector and push the connector as the tool moves in a first direction when the tool is at a first orientation relative to the first direction. The second cavity is configured to receive the portion of the connector and push the connector as the tool moves in the first direction when the tool is at a second orientation relative to the first direction. The first hook is configured to engage an opening defined by the connector and pull the connector as the tool moves in a second direction when the tool is at a third orientation relative to the first direction. The second hook is configured to engage an opening defined by the connector and pull the connector as the tool moves in the second direction when the tool is at a fourth orientation relative to the first direction.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

DRAWINGS

The accompanying drawings, which are incorporated herein and form a part of the specification, illustrate the present disclosure and, together with the description, further serve to explain the principles thereof and to enable a person skilled in the pertinent art to make and use the same.

The following Detailed Description, Figures, and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIG. 3D shows a left side view of the tool of FIG. 3A.

FIG. 3E shows a front view of the tool of FIG. 3A.

FIG. 3F shows a right side view of the tool of FIG. 3A.

Figure 1:
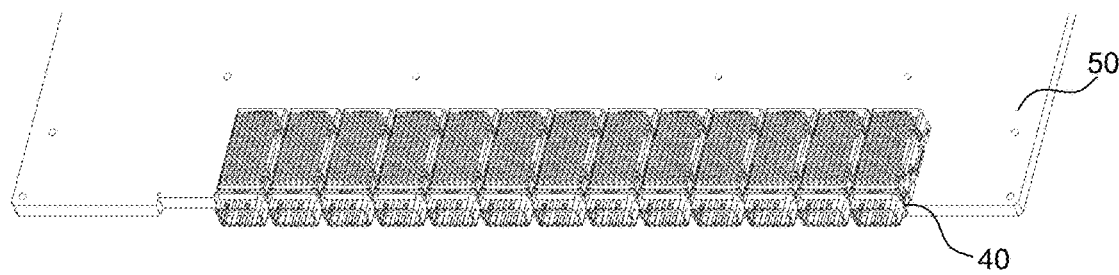
FIG. 1 shows a series of connector cages.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, this disclosure has been prepared such that when a particular feature, structure, or characteristic is described in connection with an embodiment, it is within the knowledge of one skilled in the art to apply such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Cables are widely used for a variety of purposes including signal transfer, data communication, and power transfer. It is sometimes desirable for a cable to be provided with a connector at one or both ends to allow the cable to be removably coupled with (i.e., plugged into and unplugged from) a complementary terminal (e.g., a connector cage or another cable). Coupling a connector to a terminal sometimes requires a strong grip on the connector in order to push the connector into the terminal. Similarly, decoupling a connector from a terminal sometimes requires that a strong pull be applied to a portion of the connector in order to release the connector from the terminal.

In some instances, it may be difficult or physically impossible for a person to couple or decouple a cable from a terminal by hand. For example, multiple connection terminals may be located close together or a connection terminal may be provided in a recessed location, thereby leaving limited space for a person's hands to reach, grasp, or maneuver a connector near the terminal. Connection terminals may be particularly crowded, for example, in high speed data applications, such as data centers, high performance computers, storage, and networking equipment. Even when it is possible for a person to couple or decouple a cable from a terminal by hand, it may be uncomfortable for the person to do so. For example, a person's fingers may be pinched or squeezed by other cables near a connection terminal. Additionally, coupling or decoupling a cable from a terminal may risk damaging the connector if, for example, the connector is dropped or bumped into another object during the coupling or decoupling process.

Some embodiments of the present disclosure provide a tool that can be used to couple or decouple a connector in tight spaces and without an increased risk of causing damage to the connector. As will be discussed in more detail below, the exemplifying tool illustrated herein includes a bracket and a hook. A user can use the tool to couple a cable connector by inserting a portion of the connector into a cavity defined by the bracket and moving the tool in a first direction. A user can also use the tool to decouple a cable connector by causing the hook to engage an opening defined by the connector and pulling the tool in a second direction.

In some embodiments, the bracket may include walls and/or arms to more securely hold the portion of the connector in the cavity of the bracket during the coupling process. The tool may include multiple brackets. For example, a first bracket may be located at a first end portion of the tool and a second bracket may be located at a second end of the tool. In this way, the user may use the tool at multiple orientations (e.g., a first orientation and a second orientation).

In some embodiments, the tool may include multiple hooks. This may enable the user to use the tool at multiple orientations. When multiple hooks are provided, the hooks may extend from the same lateral side of the tool body, leaving the other lateral side of the tool free from disturbances. In this way, when the tool is used in a third orientation, interference between the tool and the cable is reduced by approaching the cable from the cable's left side. When the tool is used in a fourth orientation, interference between the tool and the cable is reduced by approaching the cable from the cable's right side.

These and other embodiments are discussed below in more detail with reference to the figures.

Figure 2:
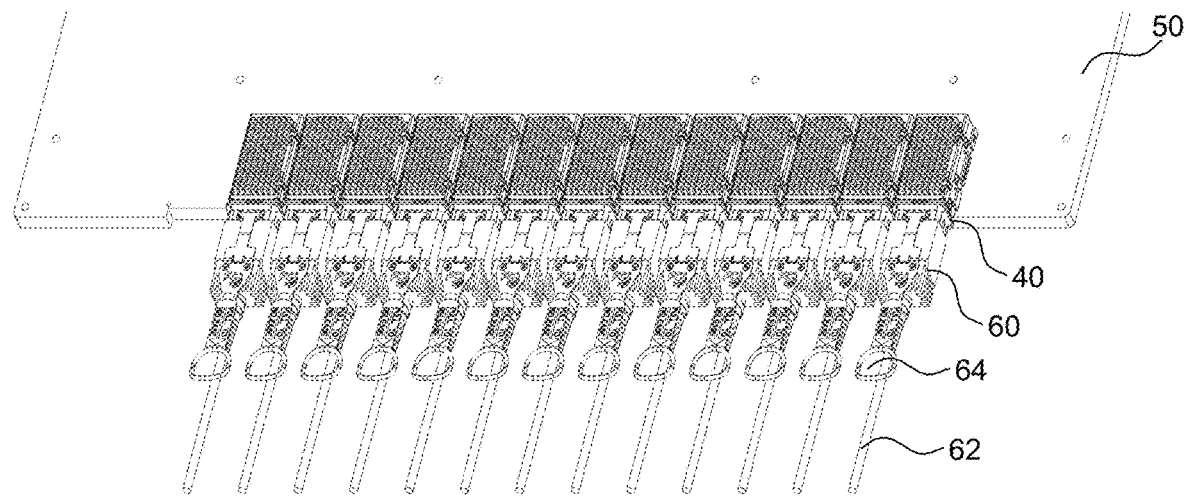
FIG. 2 shows a series of connector cages with cables connected.

FIG. 1 shows a series of connection terminals 40 on board 50. Connection terminals 40 may be, for example, connector cages 40. Board 50 may form part of server 70 (not shown). As shown in FIG. 1, multiple cages 40 may be located close together. Additionally, as shown in FIG. 2, connectors 60 may be coupled with cages 40, and cables 62 may extend from connectors 60. Cables 62 may be used for signal transfer or data communication, but cable 62 is not limited to cables for these purposes. Connectors 60 may be CXP, QSFP, or QSFP-DD type connectors. However, connectors 60 are not limited to these connector types.

When multiple connectors 60 are coupled with cages 40 as shown, for example, in FIG. 2, cables 62 extending from cages 40 may fill the space in front of or near other cages 40. This crowding of cables 62 may make it difficult or physically impossible for a person to reach, grasp, or maneuver a connector 60 by hand in order to couple or decouple the connector 60 and cage 40. As mentioned, in some instances, cage 40 may be provided in a recessed location, thereby making it difficult or physically impossible to couple or decouple connector 60 and cage 40 by hand. Additionally, coupling or decoupling connector 60 and cage 40 may risk damaging connector 60 if, for example, connector 60 is dropped or bumped into another object during the coupling or decoupling process.

In some embodiments, a tool is configured to couple and decouple a connector and cage or any other connecter-receiving receptacle. In some embodiments, the tool can include a body for coupling various components, one or more brackets for receiving and securing a portion of a connector, and one or more hooks for engaging an opening defined by the connector.

FIGS. 3A-3G show a tool 10 for coupling and decoupling a connector according to some embodiments. In some embodiments, tool 10 can include a body 100, at least one bracket disposed on body 100, and at least one hook disposed on body 100 (shown, e.g., in FIG. 3B).

In some embodiments, body 100 is elongated as illustrated in FIGS. 3A-3G. For example, body 100 may be about 4 to 8 inches long and about 1 to 2 inches wide. An elongated body may, for example, extend the reach of tool 10, thereby helping a user to access cage 40 located in a recessed or otherwise difficult-to-reach area. In some embodiments, body 100 may have another shape. Body 100 may have a first end portion 110, a second end portion 130 opposite first end portion 110, and an intermediate portion 120 between first end portion 110 and second end portion 130. Body 100 may also have a first surface 140 and a second surface 150 opposite first surface 140. A longitudinal axis may run between first end portion 110 and second end portion 130. A vertical axis may be perpendicular to the longitudinal axis and run between first surface 140 and second surface 150. A lateral axis may be perpendicular to both the longitudinal axis and the vertical axis.

In some embodiments, tool 10 includes two brackets 200 and 250 for receiving and securing a portion of a connector. First bracket 200 may be disposed at first end portion 110 of body 100, and first hook 300 may disposed at intermediate portion 120. In the illustrated embodiment, first bracket 200 and first hook 300 are located at opposite surfaces of body 100 (i.e., first bracket 200 is located at first surface 140 of body 100 and first hook 300 is located at second surface 150 of body 100). However, in other embodiments, first bracket 200 and first hook 300 may be located at the same surface of body 100.

As will be discussed in more detail, first bracket 200 defines a first cavity 210 configured to receive a portion of connector 60. In some embodiments, tool 10 may include a second bracket 250. Second bracket 250 may define a second cavity 260 configured to receive a portion of connector 60. In some embodiments, the cross-sectional shapes of the cavities defined by first bracket 200 and second bracket 250 closely correspond to the cross-sectional shapes of connector 60 received therein. In the illustrated embodiment, first bracket 200 and second bracket 250 have the same configuration. However, in other embodiments, first bracket 200 and second bracket 250 may have different configurations. For example, first cavity 210 of first bracket 200 may be configured to receive a connector of a particular size and shape, and second cavity 260 of second bracket 250 may be configured to receive a connector of a different size and/or shape. In some embodiments, first cavity 210 of first bracket 200 and second cavity 260 of second bracket 250 are configured to receive the same type of connector. However, in other embodiments, first cavity 210 and second cavity 260 are configured to receive different types of connectors. For example, cavity 210 may be configured to receive a CXP type connector, while cavity 260 may be configured to receive a QSFP type connector. In the illustrated embodiment, first bracket 200 and second bracket 250 are located at the same surface of body 100 (i.e., first bracket 200 and second bracket 250 are both located at first surface 140 of body 100). However, in other embodiments, first bracket 200 and second bracket 250 may be located at different surfaces of body 100.

As will be discussed in more detail, first hook 300 (shown, for example, in FIG. 3B) is configured to engage an opening 64 defined by connector 60. In the illustrated embodiment, first hook 300 is oriented away from first end portion 110 of body 100 (i.e., opening 310 of first hook 300 faces away from first end portion 110 of body 100). However, in other embodiments, first hook 300 may be oriented toward first end portion 110 of body or may be oriented in another direction.

In some embodiments, tool 10 may include a second hook 350. Second hook 350 may be configured to engage an opening 64 defined by connector 60. In the illustrated embodiment, first hook 300 and second hook 350 have the same configuration. However, in other embodiments, first hook 300 and second hook 350 may have different configurations. For example, first hook 300 may be configured to engage an opening of a particular size and shape, and second hook 350 may be configured to engage an opening of a different size and/or shape. In the illustrated embodiment, first hook 300 and second hook 350 are located at the same surface of body 100 (i.e., first hook 300 and second hook 350 are both located at second surface 150 of body 100). However, in other embodiments, first hook 300 and second hook 350 may be located at different surfaces of body 100. In the illustrated embodiment, first hook 300 and second hook 350 are oriented in opposite directions (i.e., first hook 300 is oriented away from first end portion 110 of body, and second hook 350 is oriented toward first end portion 110 of body 100). However, in other embodiments, first hook 300 and second hook 350 may be oriented in the same direction or in different directions that are not opposite directions.

Figure 3A:
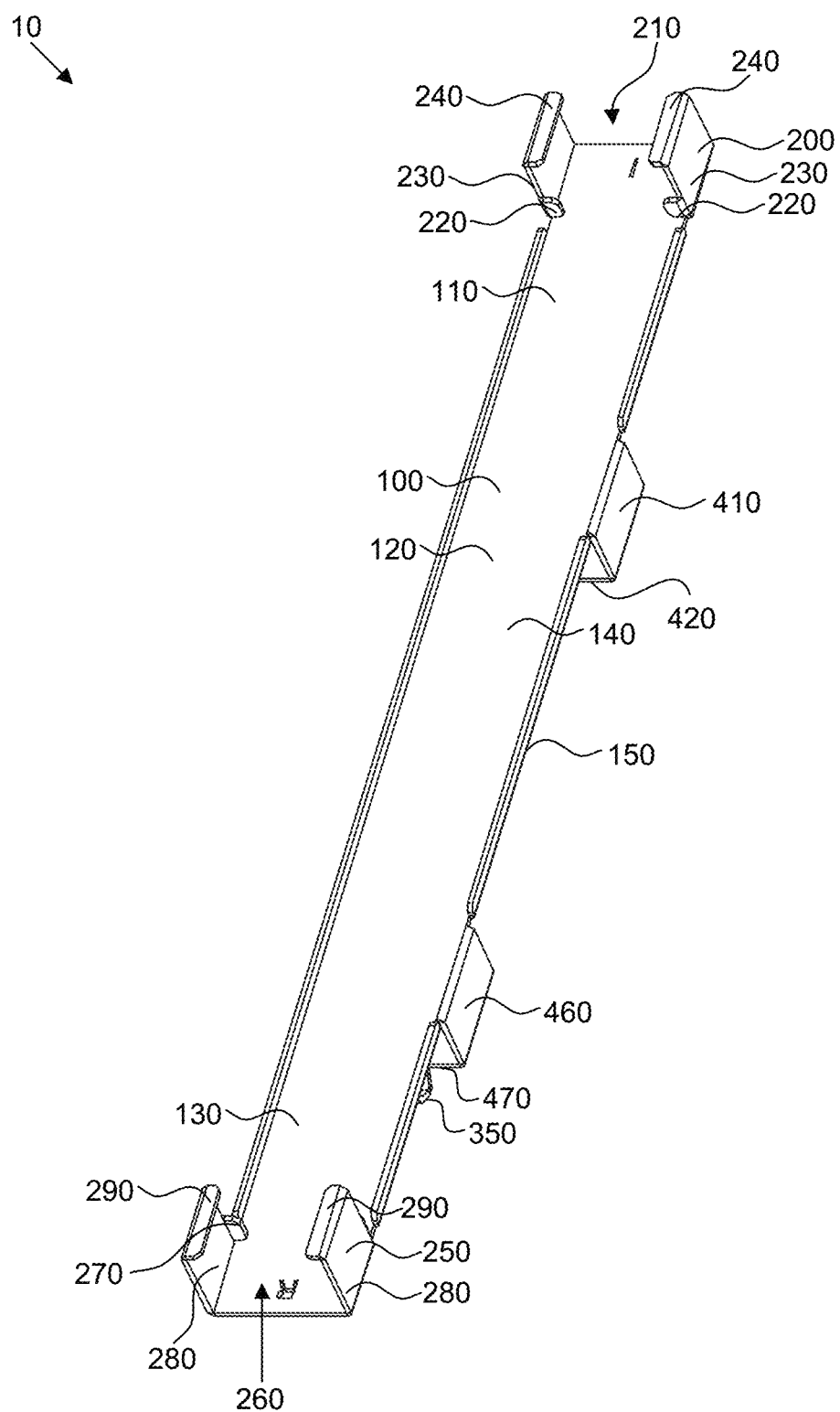
FIG. 3A shows a front perspective view of a tool for coupling and decoupling a connector of a cable.
Figure 3B:
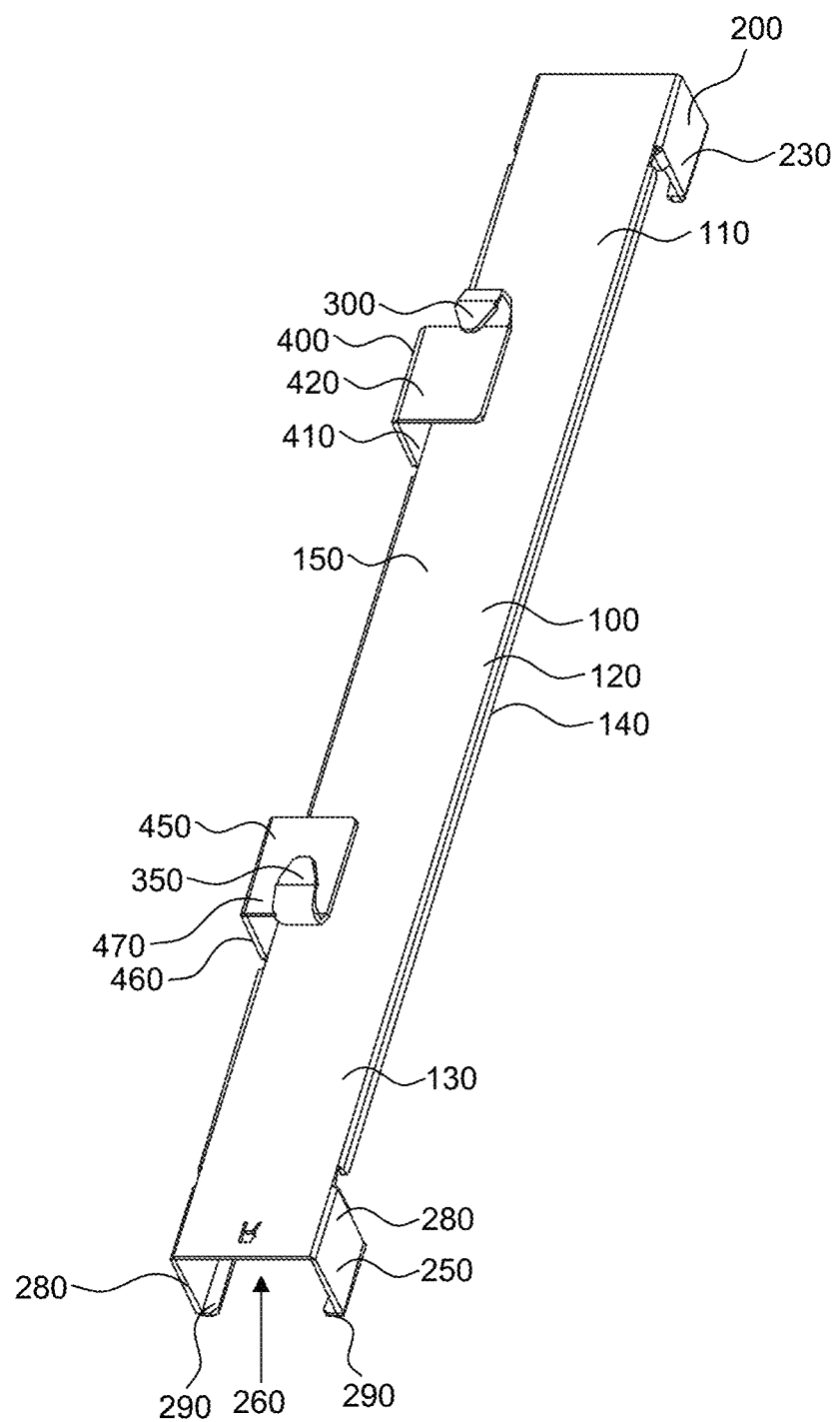
FIG. 3B shows a bottom perspective view of the tool of FIG. 3A.
Figure 3C:
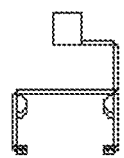
FIG. 3C shows a top view of the tool of FIG. 3A.
Figure 3G:
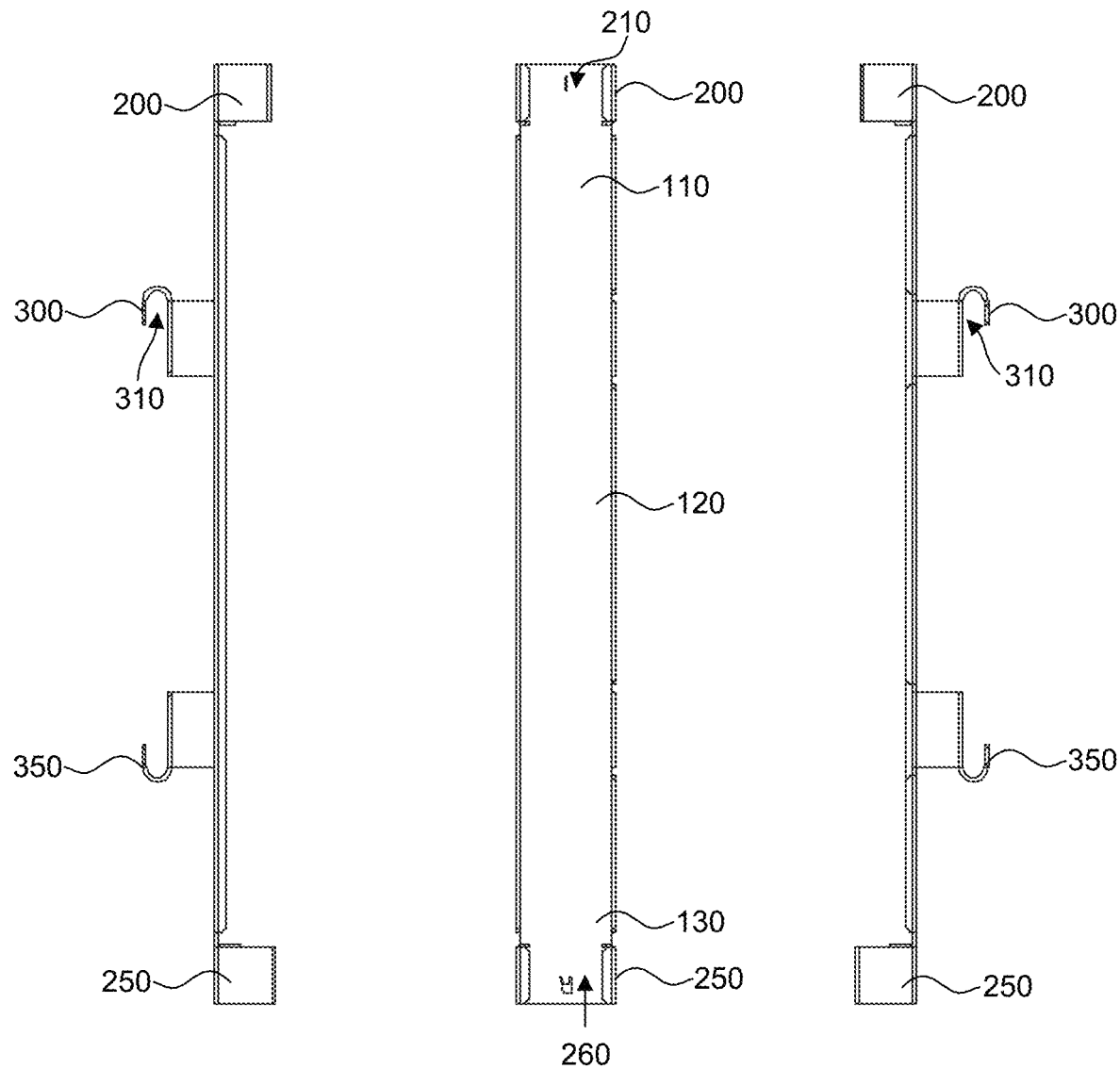
FIG. 3G shows a bottom view of the tool of FIG. 3A.
Figure 3G:
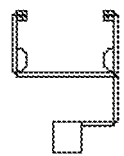

In the illustrated embodiment, first extension 400 and second extension 450 connect first hook 300 and second hook 350, respectively, to body 100. In some embodiments, first extension 400 and second extension 450 extend from the same lateral side of body 100. For example, as shown in FIG. 3B, first extension 400 and second extension 450 both extend from the right side of body 100. As will be discussed in greater detail, providing extensions 400 and 450 on the same lateral side of body 100 leaves the other later side free from disturbances. In turn, this can afford a user better access a connector 60 that is more crowded to one side.

Tool 10 may be formed of metal, plastic, or any other suitable material. In some embodiments, body 100, first bracket 200, first hook 300, and optionally second bracket 250 and second hook 350 are formed as a single, unitary piece.

In some embodiments, body 100, first bracket 200, first hook 300, and optionally second bracket 250 and second hook 350, are formed as a single, unitary piece is through a die cutting or punching process. In this process, a die cuts or punches a sheet of metal or other suitable material to an appropriate blank shape. The blank for tool 10, for example, would include a center portion corresponding to body 100, extension at the first end portion 110 corresponding to bracket 200, and another extension at the intermediate portion 120 corresponding to hook 300. These extension of the blank can then be bent to form the three-dimensional shape of tool 10.

In some embodiments, some or all of these elements of tool 10 can be formed as separate components.

Figure 4A:
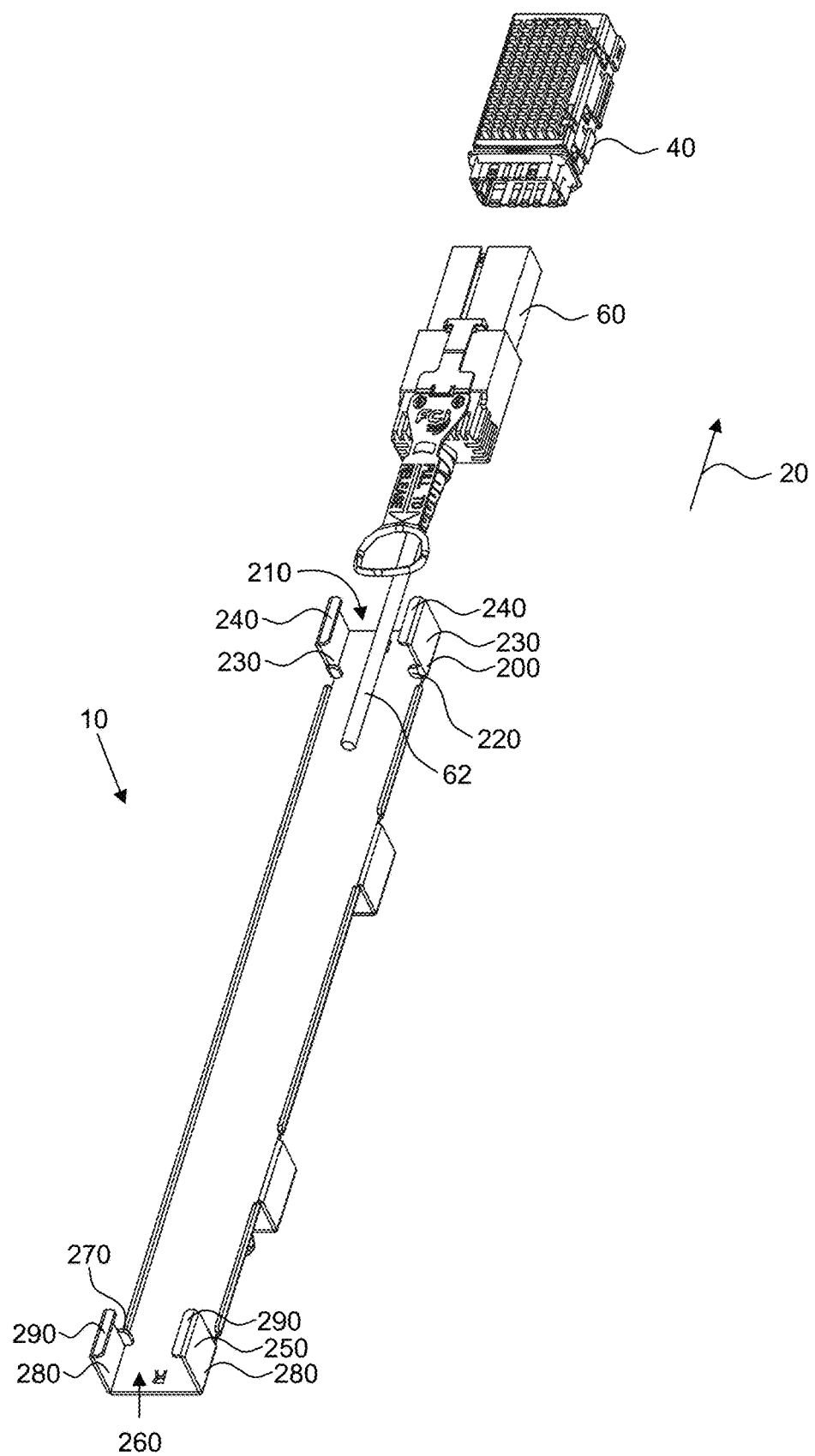
FIGS. 4A-4C show intermediate stages of using the tool of FIG. 3A to couple a connector of a cable.
Figure 4B:
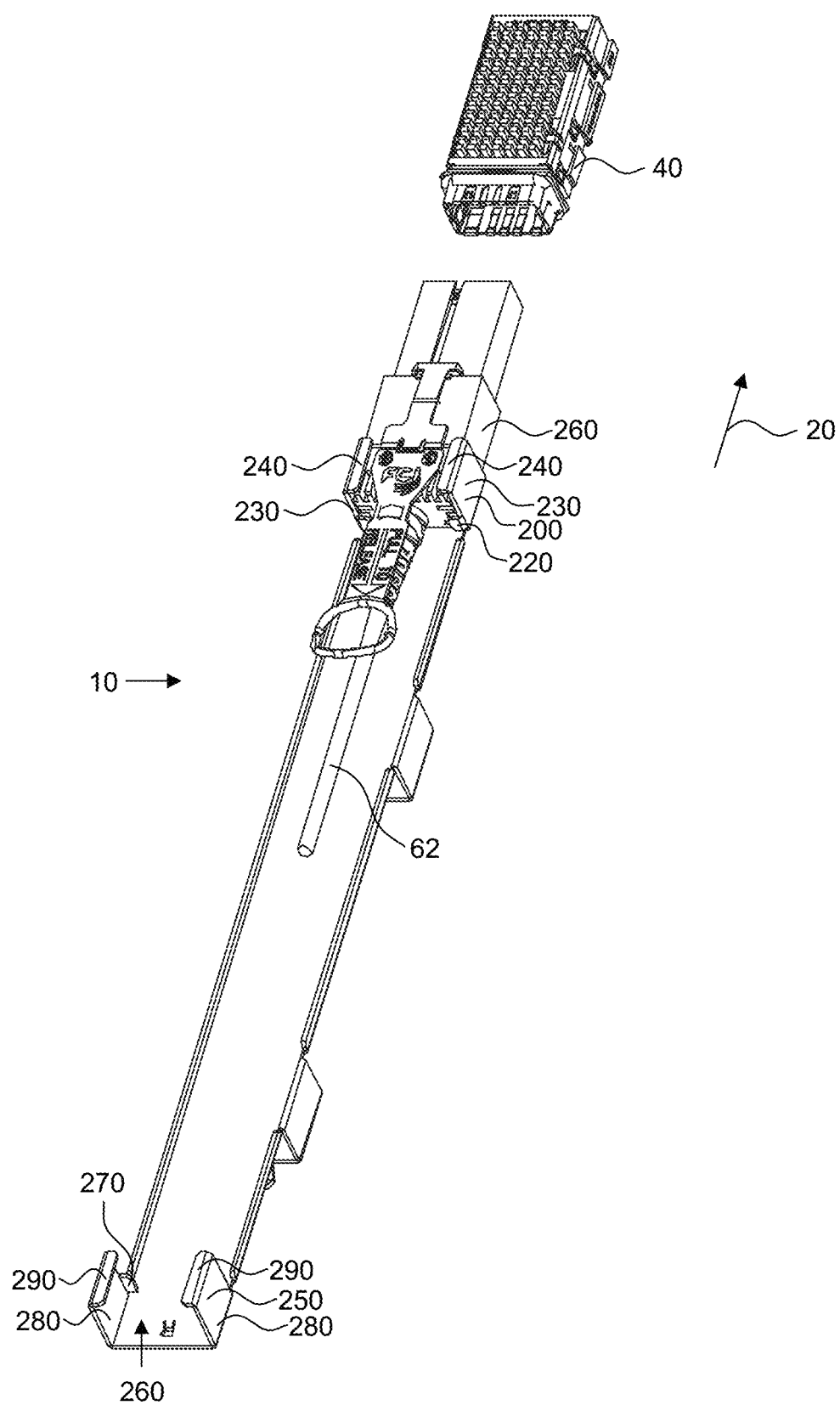
Figure 4C:
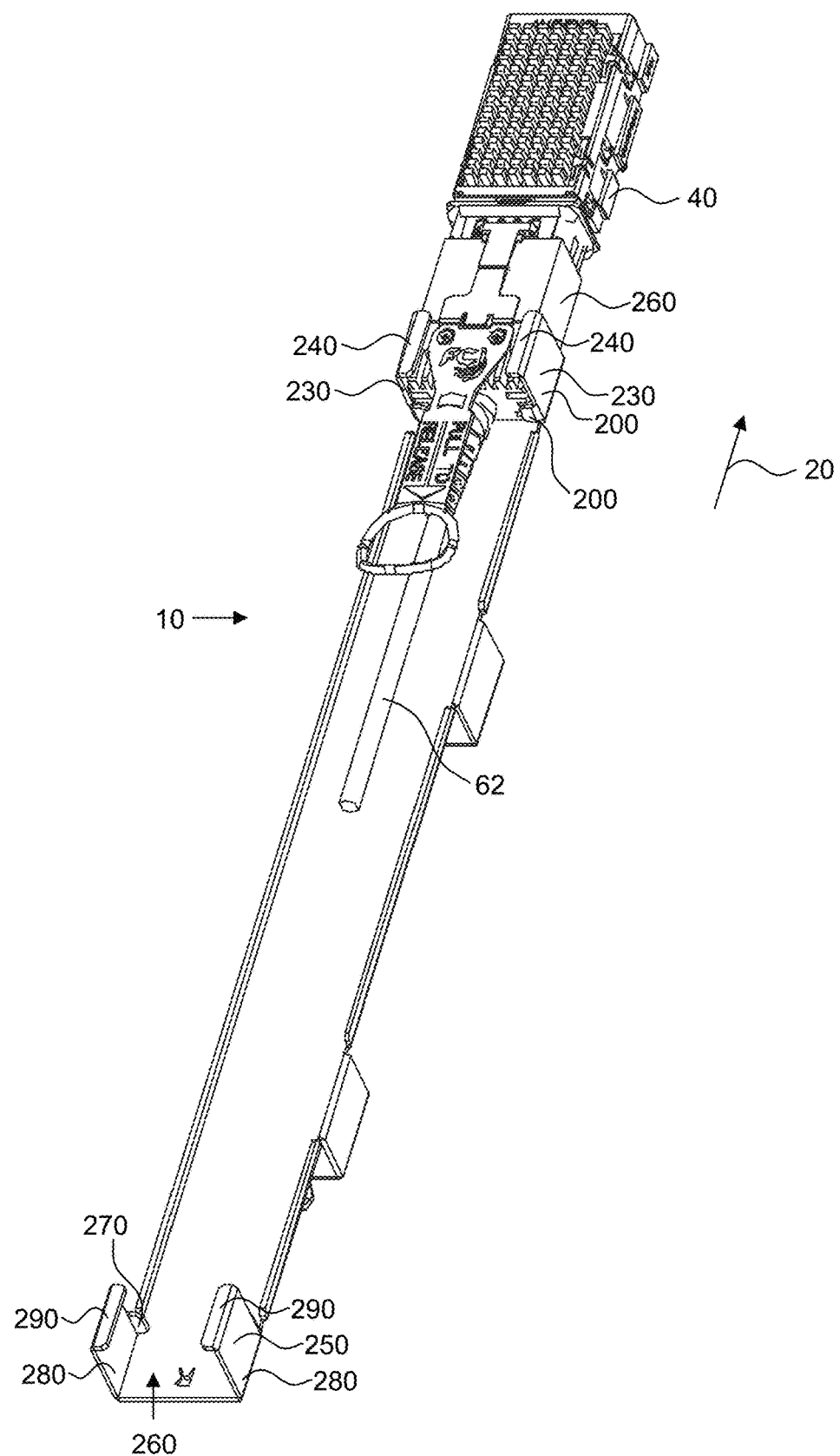

As shown in FIGS. 4A-4C, tool 10 can be used to couple connector 60 to cage 40. As mentioned, tool 10 includes first bracket 200 at first end portion 110 of body 100. First bracket 200 defines a first cavity 210 configured to receive a portion of connector 60.

In FIG. 4A, connector 60 is not coupled to cage 40, and connector 60 is outside first cavity 210 defined by first bracket 200. In FIG. 4B, a portion of connector 60 is received in first cavity 210. As tool 10 is moved in first direction 20 toward cage 40, first bracket 200 pushes connector 60 in first direction 20 and into connector cage 40 (as shown in FIG. 4C).

In the illustrated embodiment, first bracket 200 is rectangular. However, first bracket 200 is not limited to a rectangular shape. For example, the size and shape of first bracket 200 may vary according to the size and/or shape of the connector 60 intended to be received in first cavity 210. In some embodiments, first cavity 210 is configured to receive a particular type of connector (e.g., a CXP, QSFP, or QSFP-DD type connector). In some embodiments, first cavity 210 may be configured to receive a variety of connectors.

First bracket 200 may be configured to extend at least partially around a perimeter of connector 60. For example, in the illustrated embodiment, first bracket 200 includes first side walls 230 and first arms 240 that extend partially around the perimeter of connector 60. In this way, first bracket 200 restrains lateral and vertical movement of connector 60 relative to tool 10 when connector 60 is received in first cavity 210. In some embodiments, first side walls 230 and first arms 240 grip connector 60 when the portion of connector 60 is received in cavity 210. In this way, when tool 10 is moved in first direction 20, first side walls 230 and first arms 240 may move in first direction 20, thereby moving connector 60 in first direction 20.

Figure 5:
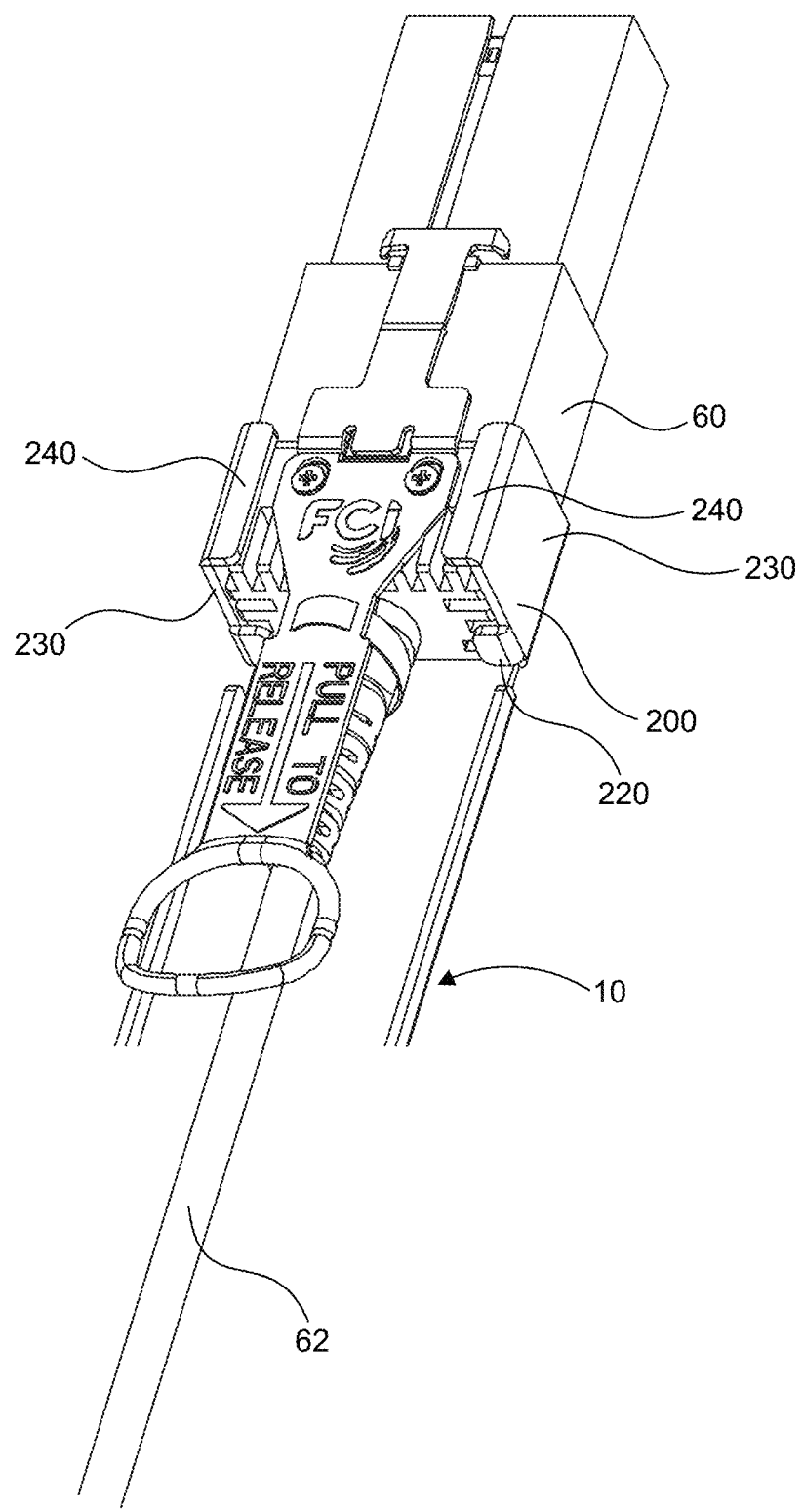
FIG. 5 shows an enlarged view of a portion of FIG. 4B.

In some embodiments, bracket 200 includes one or more tabs 220 (shown, for example, in FIG. 5) extending laterally from first surface 140 of body 100 or from first side walls 230/first arms 240. As a result, when connector 60 is received in first cavity 210 and tool 10 is moved in first direction 20, first tabs 220 move in first direction 20, thereby engaging a rear surface (i.e., the surface facing away from the cage) of the connector 60 and moving connector 60 in first direction 20.

In some embodiments, tool 10 may include a second bracket 250. In the illustrated embodiment, second bracket 250 is provided at second end portion 130 of body 100. However, the location of second bracket 250 is not limited to the second end portion 130 of body 100. Second bracket 250 may define a second cavity 260 configured to receive a portion of connector 60. Second bracket 250 may include some or all of the features described above with respect to first bracket 200. For example, second bracket 250 may include second tabs 270, second walls 280, and/or second arms 290 similar to first tabs 220, first walls 230, and first arms 240, respectively.

Second bracket 250 may enable, for example, tool 10 to be used in multiple orientations. For example, in the illustrated embodiment, tool 10 can be used in a first orientation or a second orientation. In the first orientation (shown, for example, in FIG. 4A), the longitudinal axis of body 100 is aligned with first direction 20 and first bracket 200 is positioned closer to connector 60 than second bracket 250 is. As described above, to use tool 10 in this orientation, a portion of connector 60 is received in first cavity 210. Tool 10 is then moved in first direction 20, thereby pushing connector 60 toward cage 40 and coupling connector 60 with cage 40. In the second orientation (not shown), the longitudinal axis of body 100 is aligned with first direction 20 and second bracket 250 is positioned closer to connector 60 than first bracket 200 is. That is, second orientation is rotated 180 degrees from first orientation about a vertical axis of tool 10. To use tool 10 in this orientation, a portion of connector 60 is received in second cavity 260. Tool 10 is then moved in first direction 20, thereby pushing connector 60 toward cage 40 and coupling connector 60 with cage 40.

In the illustrated embodiment, first bracket 200 and second bracket 250 have the same configuration. However, in other embodiments, first bracket 200 and second bracket 250 may have different configurations. For example, first cavity 210 of first bracket 200 may be configured to receive a connector of a particular size and shape, and second cavity 260 of second bracket 250 may be configured to receive a connector of a different size and/or shape.

In the illustrated embodiment, first bracket 200 and second bracket 250 are located at the same surface of body 100

(i.e., first bracket 200 and second bracket 250 are both located at first surface 140 of body 100). However, in other embodiments, first bracket 200 and second bracket 250 may be located at different surfaces of body 100.

Figure 6A:
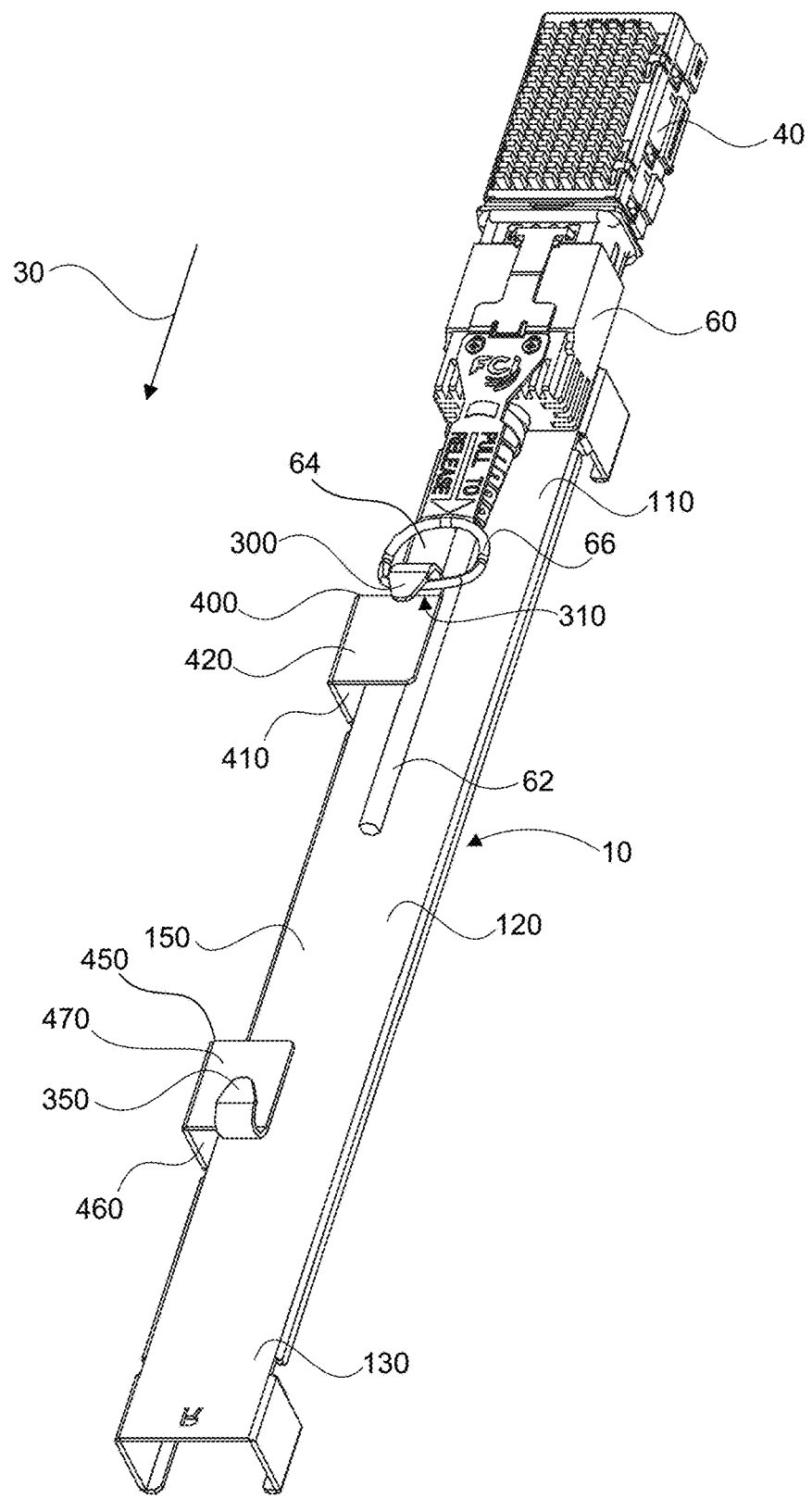
FIGS. 6A-6C show intermediate stages of using the tool of FIG. 3A to decouple a connector of a cable.
Figure 6B:
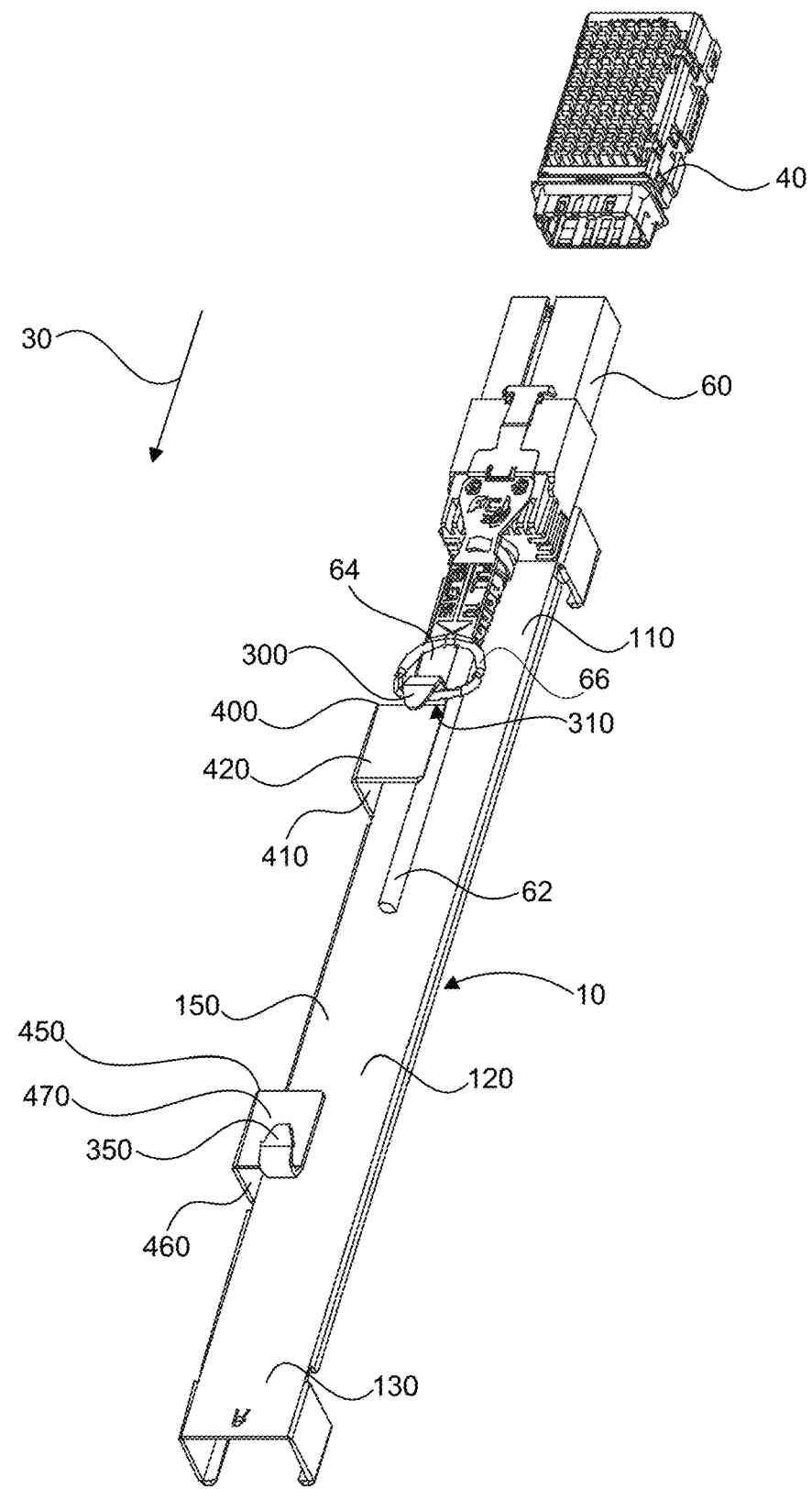
Figure 6C:
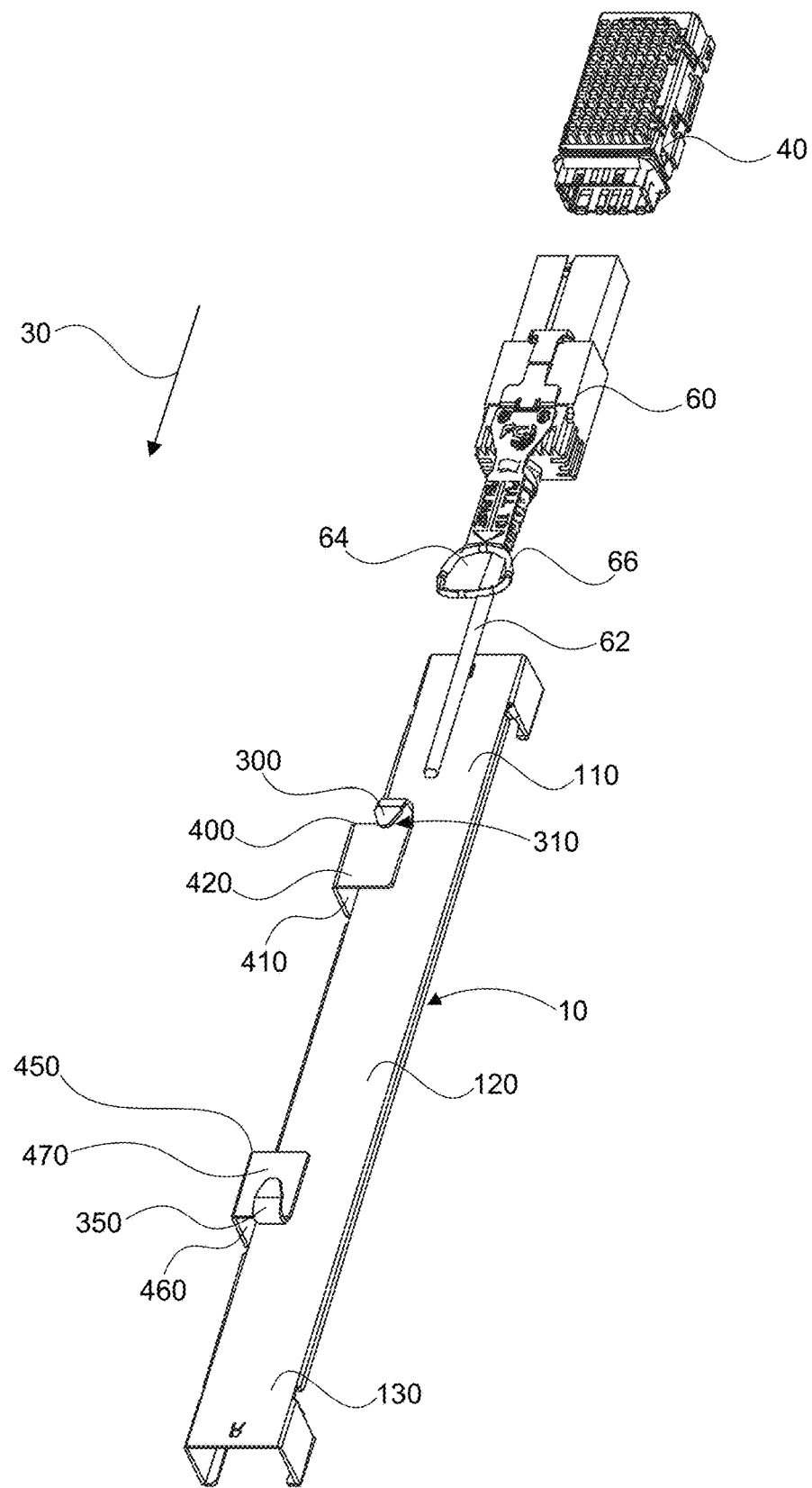

As shown in FIGS. 6A-6C, tool 10 can also be used to decouple connector 60 from cage 40. As mentioned, tool 10 includes first hook 300 at an intermediate portion 120 of body 100. First hook 300 is configured to engage opening 64 defined by connector 60. In some embodiments, connector 60 includes a handle 66 (e.g., loop 66) defining opening 64. In other embodiments (not shown), opening 64 is a cavity defined by the body of connector 60. In FIG. 6A, connector 60 is coupled with cage 40, and first hook 300 is engaged with opening 64 defined by connector 60. As tool 10 is moved in second direction 30 away from cage 40 (as show in FIG. 6B), first hook 300 pulls opening 64 defined by connector 60 in second direction 30, thereby pulling connector 60 out of cage 40. In FIG. 6C, connector 60 is no longer coupled to cage 40, and first hook 300 is no longer engaged with In the illustrated embodiment, first hook 300 is oriented away from first end portion 110 of body 100 (i.e., opening 310 of first hook 300 faces away from first end portion 110 of body 100). As a result, when tool 10 is used in a third orientation (shown, for example, in FIG. 6A), opening 310 of first hook 300 opens in second direction 30. In this way, first hook 300 is able to effectively engage and pull opening 64 defined by connector 60 in second direction 30. The size and shape of first hook 300 may vary according to the size and/or shape of opening 64 that it is intended to engage. In some embodiments, first hook 300 is configured to engage a particular type of connector (e.g., a CXP, QSFP, or QSFP-DD type connector). However, in other embodiments, first hook 300 may be configured to engage a variety of openings 64.

In some embodiments, first hook 300 is spaced away from body 100. As shown, for example in FIG. 6A, this spacing may allow cable 62 to pass between first hook 300 and body 100. Passing cable 62 between hook 300 and body 100 may, for example, help a user guide hook 300 toward opening 64, or may allow for easier maneuvering of tool 10 in a crowded area.

Tool 10 may include first extension 400 connecting first hook 300 to body 100. In the illustrated embodiment, first extension 400 includes first walls 410 extending vertically from second surface 150 of body 100 and first arms 420 extending laterally inward from wall 410. In this way, first hook 300 is spaced apart from body 100 and is positioned at or near the lateral center of tool 10. In other embodiments, first extension 400 is curved or angled to achieve a similar effect.

In some embodiments, tool 10 may include a second hook 350. In the illustrated embodiment, second hook 350 is provided at intermediate portion 120 of body 100. However, the location of second hook 350 is not limited to intermediate portion 120 of body 100 as shown in the figures. Second hook 350 may be configured to engage opening 64 defined by connector 60. Second hook 350 may include some or all of the features described above with respect to first hook 300. Tool 10 may also include a second extension 450 connecting second hook 350 to body 100. Second extension 450 may include some or all of the features described above with respect to first extension 400.

Figure 7:
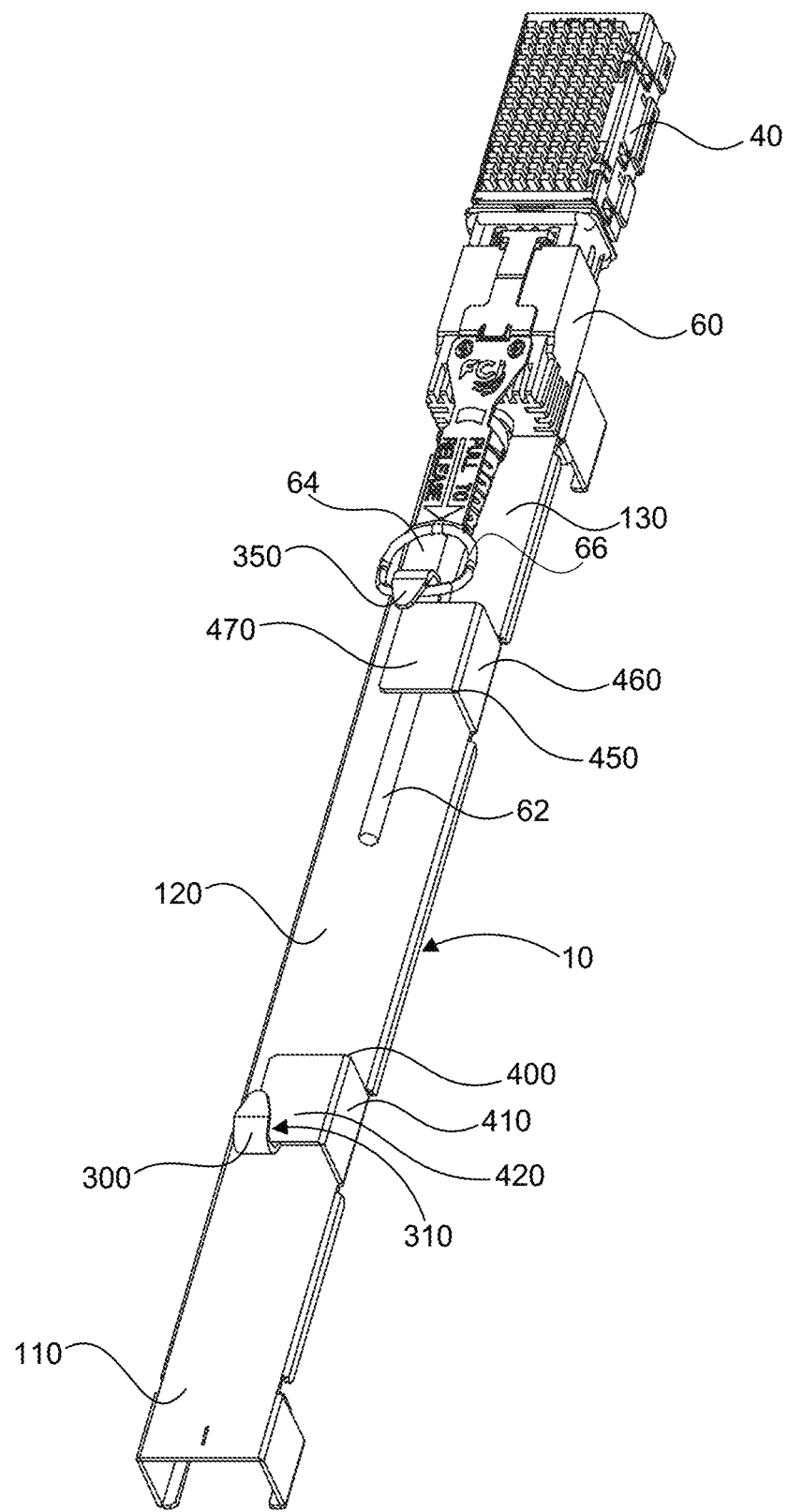
FIG. 7 shows an intermediate stage of using the tool of FIG. 3A in another orientation to decouple a connector of a cable.

In some embodiments, first hook 300 and second hook 350 are oriented in the same direction. In the illustrated embodiment, first hook 300 and second hook 350 are oriented in different directions (first hook 300 is oriented away from first end portion 110 of body 100, and second hook 300 is oriented toward first end portion 110 of body 100). Different orientations of first hook 300 and second hook 350 may enable, for example, tool 10 to be used in multiple orientations. For example, in the illustrated embodiment, tool 10 can be used in a third orientation or a fourth orientation. In the third orientation (shown, for example, in FIG. 6A), the longitudinal axis of body 100 is aligned with second direction 30 and first hook 300 is positioned closer to connector 60 than second hook 350 is. As described above, to use tool 10 in this orientation, first hook 300 engages opening 64 defined by connector 60. Tool 10 is then moved in second direction 30, thereby pulling connector 60 away from cage 40 and decoupling connector 60 from cage 40. In the fourth orientation (shown, for example, in FIG. 7), the longitudinal axis of body 100 is aligned with second direction 30 and second hook 350 is positioned closer to connector 60 than first hook 300 is. That is, illustrated fourth orientation is rotated 180 degrees from illustrated third orientation about a vertical axis of tool 10. To use tool 10 in this orientation, second hook 350 engages opening 64 defined by connector 60. Tool 10 is then moved in second direction 30, thereby pulling connector 60 away from cage 40 and decoupling connector 60 from cage 40.

In some embodiments in which tool 10 includes second hook 350, first hook 300 and second hook 350 may extend from the same lateral side of the body 100, leaving the other lateral side of tool 10 free from disturbances and any extensions. In this way, when tool 10 is used in the third orientation described above, interference between tool 10 and cable 62 is reduced by approaching cable 62 from the cable's left side. When tool 10 is used in the fourth orientation described above, interference between tool 10 and cable 62 is reduced by approaching cable 62 from the cable's right side. Moreover, a user decide which orientation is easiest to use given a specific configuration of terminals, connectors, cables, and other obstacles. For example, when space is crowded at the left side of connector 60, the user can use tool 10 in the fourth orientation. On the other hand, when space is crowded at the left side of connector 60, the user can use tool 10 in the third orientation.

In the illustrated embodiment, first hook 300 and second hook 350 have the same configuration. However, in other embodiments, first hook 300 and second hook 350 may have different configurations. For example, first hook 300 may be configured to engage opening 64 a particular size and shape, and second hook 350 may be configured to engage an opening of a different size and/or shape. In the illustrated embodiment, first hook 300 and second hook 350 are spaced equally from first and second ends of body 100—that is, the distance between first hook 300 and first ends of body 100 is the same as the distance between second hook 350 and the opposing end of body 100. However, in other embodiments, either first hook 300 or second hook 350 may be spaced further from its closest end.

In the illustrated embodiment, first hook 300 and second hook 350 are located at the same surface of body 100 (i.e., first hook 300 and second hook 350 are both located at second surface 150 of body 100). However, in other embodiments, first hook 300 and second hook 350 may be located at different surfaces of body 100.

In the illustrated embodiment, brackets 200, 250 and hooks 300, 350 are located at opposite surfaces of body 100 (i.e., brackets 200, 250 are located at first surface 140 of body 100 and hooks 300, 350 are located at second surface 150 of body 100). However, in other embodiments, brackets 200, 250 and hooks 300, 350 may be located at the same surface of body 100.

Figure 8:
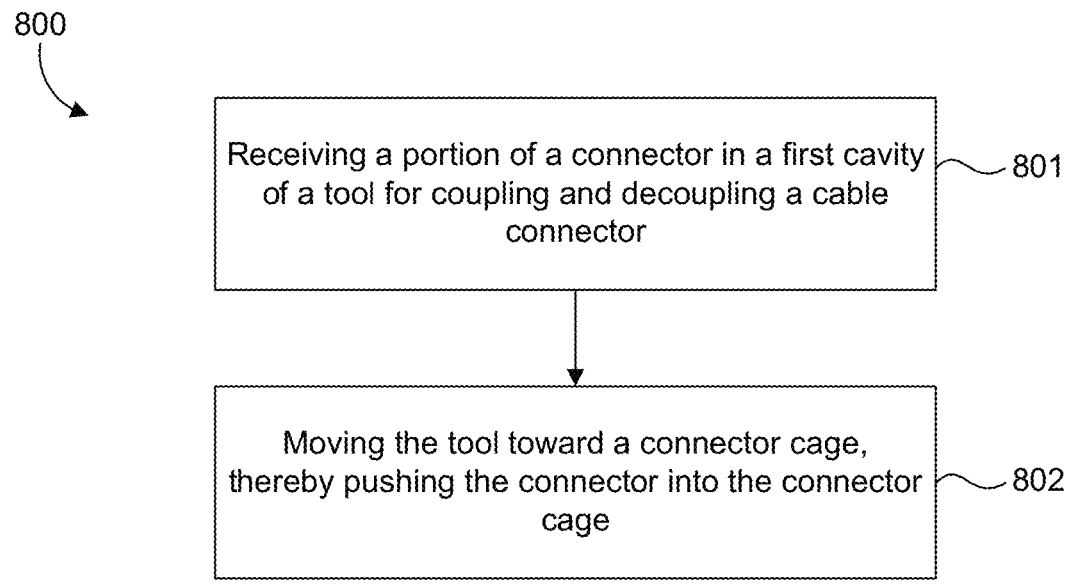
FIG. 8 shows a process for coupling a connector using the apparatus of FIG. 3A.

FIG. 8 shows a method for coupling a connector using tool 10, which may include some or all of the features, structures, or characteristics discussed above. Operation 801 includes receiving a portion of connector 60 in the first cavity of tool 10 as discussed above. Operation 802 includes moving tool 10 in first direction 20 toward cage 40, thereby causing first bracket 200 to push connector in first direction 20 and into cage 40.

Figure 9:
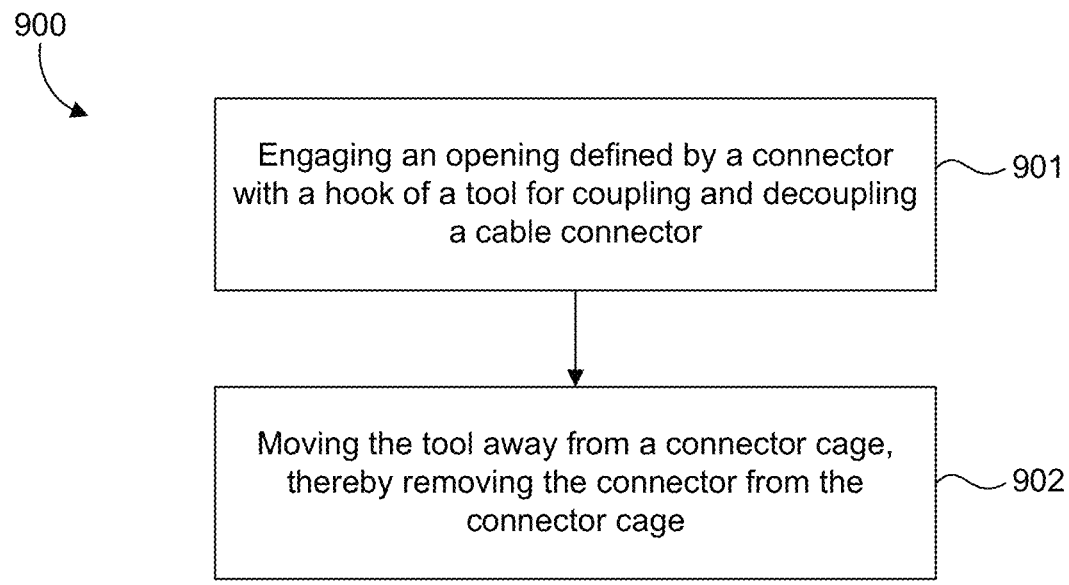
FIG. 9 shows a process for decoupling a connector using the apparatus of FIG. 3A.

FIG. 9 shows a method for decoupling a connector using tool 10, which may include some of all of the features, structures, or characteristics discussed above. Operation 901 includes engaging hook 300 with opening 64 defined by connector 60 as discussed above. Operation 902 includes moving tool 10 in second direction 30 away from cage 40, thereby pulling connector 60 out of cage 40.

In some embodiments, the methods of FIGS. 8 and 9 are performed during the same installation or maintenance process.

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A tool for coupling and decoupling a connector of a cable, the tool comprising:
   a body having:
      a first end portion, a second end portion opposite the first end portion, and an intermediate portion between the first end portion and the second end portion,
      a first surface and a second surface opposite the first surface,
      a longitudinal axis running between the first end portion and the second end portion;
   a bracket disposed at the first end portion, the bracket defining a cavity configured to receive a portion of the connector, the bracket configured to push the connector as the tool moves in a first direction; and
   a first hook disposed at the intermediate portion, the first hook configured to engage an opening defined by the connector and pull the connector as the tool moves in a second direction different than the first direction.

2. The tool of claim 1, wherein the body is elongated along the longitudinal axis.

3. The tool of claim 1, wherein the first direction is opposite the second direction.

4. The tool of claim 1, wherein the bracket comprises a tab extending from the first surface of the body or from a wall extending from the first surface of the body, and
   wherein the tab is configured to engage a rear surface of the portion of the connector when the portion of the connecter is received in the cavity.

5. The tool of claim 1, wherein the bracket comprises:
   a first and a second wall extending from the first surface of the body and configured to engage side surfaces of the portion of the connector when the portion of the connector is received in the cavity; and
   an arm extending from the first or second wall and configured to engage a top surface of the portion of the connector when the portion of the connector is received in the cavity.

6. The tool of claim 1, wherein the bracket extends from the first surface of the body and the first hook extends from the second surface of the body.

7. The tool of claim 1 further comprising an extension connecting the first hook to the body.

8. The tool of claim 7, wherein the extension spaces the first hook away from the body such that the cable extending from the connector can pass between the first hook and the body.

9. The tool of claim 1, wherein the first hook opens toward the second end portion.

10. The tool of claim 1 further comprising a second hook.

11. The tool of claim 10, wherein the first and second hooks are oriented in opposite directions.

12. The tool of claim 10 further comprising:
a first extension connecting the first hook to the body at a first side of the body; and
a second extension connecting the second hook to the body at the first side of the body, wherein:
the first hook is configured to engage the opening defined by the connector when the tool is at a first orientation relative to the first direction,
the second hook is configured to engage the opening defined by the connector when the tool is at a second orientation relative to the first direction, the second orientation rotated 180 degrees from the first orientation about an axis perpendicular to the longitudinal axis,
the first and second hooks are spaced away from the body such that when the tool is at the first orientation the cable extending from the connector can pass between the hooks and the body by approaching the cable from the cable's left side, and
the first and second hooks are spaced away from the body such that when the tool is at the second orientation the cable extending from the connector can pass between the hooks and the body by approaching the cable from the cable's right side.

13. The tool of claim 1, wherein the body, the bracket, and the first hook are formed as a unitary piece.

14. A tool for coupling and decoupling a connector of a cable, the tool comprising:
a body having:
  a first end portion, a second end portion opposite the first end portion, and an intermediate portion between the first end portion and the second end portion; and
  a longitudinal axis running between the first end portion and the second end portion;
a first bracket disposed on the first end portion and defining a first cavity configured to receive a portion of a connector;
a first hook disposed on the intermediate portion;
a second bracket disposed on the second end portion and defining a second cavity configured to receive the portion of the connector; and
a second hook disposed on the intermediate portion, wherein:
the first cavity is configured to receive the portion of the connector and push the connector as the tool moves in a first direction when the tool is at a first orientation relative to the first direction;
the second cavity is configured to receive the portion of the connector and push the connector as the tool moves in the first direction when the tool is at a second orientation relative to the first direction;
the first hook is configured to engage an opening defined by the connector and pull the connector as the tool moves in a second direction when the tool is at a third orientation relative to the first direction; and
the second hook is configured to engage the opening defined by the connector and pull the connector as the tool moves in the second direction when the tool is at a fourth orientation relative to the first direction.

15. The tool of claim 14, wherein the second orientation is 180 degrees from the first orientation about an axis perpendicular to the longitudinal axis, and the fourth orientation is 180 degrees from the third orientation about the axis perpendicular to the longitudinal axis.

16. The tool of claim 14, wherein the first bracket and the second bracket have the same configuration.

17. The tool of claim 14, wherein the first hook is positioned a first distance from a first end of the body, the second hook is positioned a second distance from a second end of the body, and the first and second distances are the same.

18. The tool of claim 14, wherein the first and second hooks are oriented in opposite directions.

19. A method of using a tool to couple a connector of a cable, the method comprising:
receiving a portion of the connector in the first cavity of the tool of claim 1; and
moving the tool of claim 1 toward a connection terminal, thereby pushing the connector into the connection terminal.

20. A method of using a tool to decouple a connector of a cable, the method comprising:
engaging an opening defined by the connector with the hook of the tool of claim 1; and
moving the tool of claim 1 away from a connection terminal, thereby removing the connector from the connection terminal.

* * * * *